United States Patent [19]

Caputo

[11] Patent Number: 5,193,266
[45] Date of Patent: Mar. 16, 1993

[54] METHOD OF MAKING A BRUSHLESS ELECTRIC MOTOR AND ROTOR THEREFOR

[75] Inventor: Mike Caputo, Milan, Italy

[73] Assignee: SAES Getters SpA, Milan, Italy

[21] Appl. No.: 770,426

[22] Filed: Oct. 3, 1991

[30] Foreign Application Priority Data

Nov. 15, 1990 [IT] Italy ............................... 22064 A/90

[51] Int. Cl.⁵ .......................................... H02K 15/02
[52] U.S. Cl. ......................................... 29/598; 310/42; 310/45; 310/156
[58] Field of Search ................... 29/598, 597; 310/156, 310/42, 43, 45

[56] References Cited

U.S. PATENT DOCUMENTS

| | | |
|---|---|---|
| 2,680,822 | 6/1954 | Brainard ............................ 29/598 X |
| 3,909,647 | 9/1975 | Peterson . |
| 3,979,821 | 9/1976 | Noodleman ........................... 29/598 |
| 4,088,177 | 5/1978 | Armstrong et al. . |
| 4,104,787 | 8/1978 | Jandeska et al. . |
| 4,150,312 | 4/1979 | Armstrong et al. . |
| 4,172,717 | 10/1979 | Tokunaga et al. . |
| 4,213,803 | 7/1980 | Yoneyama et al. . |
| 4,221,613 | 9/1980 | Imaizumi et al. . |
| 4,234,360 | 11/1980 | Frischmann et al. . |
| 4,325,757 | 4/1982 | Jandeska et al. . |
| 4,339,874 | 7/1982 | McCarty et al. . |
| 4,354,126 | 10/1982 | Yates . |
| 4,510,680 | 4/1985 | Miller et al. . |
| 4,617,726 | 10/1986 | Denk ..................................... 29/598 |
| 4,638,200 | 1/1987 | Le Corre et al. . |
| 4,658,165 | 4/1987 | Vanderschaeghe . |
| 4,760,300 | 7/1988 | Yoshida et al. . |
| 4,845,395 | 4/1989 | Bost . |
| 4,916,346 | 4/1990 | Kliman . |
| 4,918,831 | 4/1990 | Kliman . |

FOREIGN PATENT DOCUMENTS

| | | |
|---|---|---|
| 0156482 | 10/1985 | European Pat. Off. . |
| 0156483 | 10/1985 | European Pat. Off. . |
| 2548843 | 1/1985 | France . |

OTHER PUBLICATIONS

Venturini, Marco, "L'Azionamento Brushless" 17 pages; presented Jul. 6, 1984.

*Primary Examiner*—Carl E. Hall
*Attorney, Agent, or Firm*—David R. Murphy

[57] ABSTRACT

A brushless electric motor is described whose rotor consists of a rotatable shaft and at least one metal permanent magnet, preferably porous, bond to the shaft by a thin layer of bonding metal. In this way an improved rotor is obtained which does not require other retaining means or glues. The magnets are thus permanently and safely fixed to the rotor with an increased magnetic surface. A process for producing this type of rotor is also described.

1 Claim, 2 Drawing Sheets

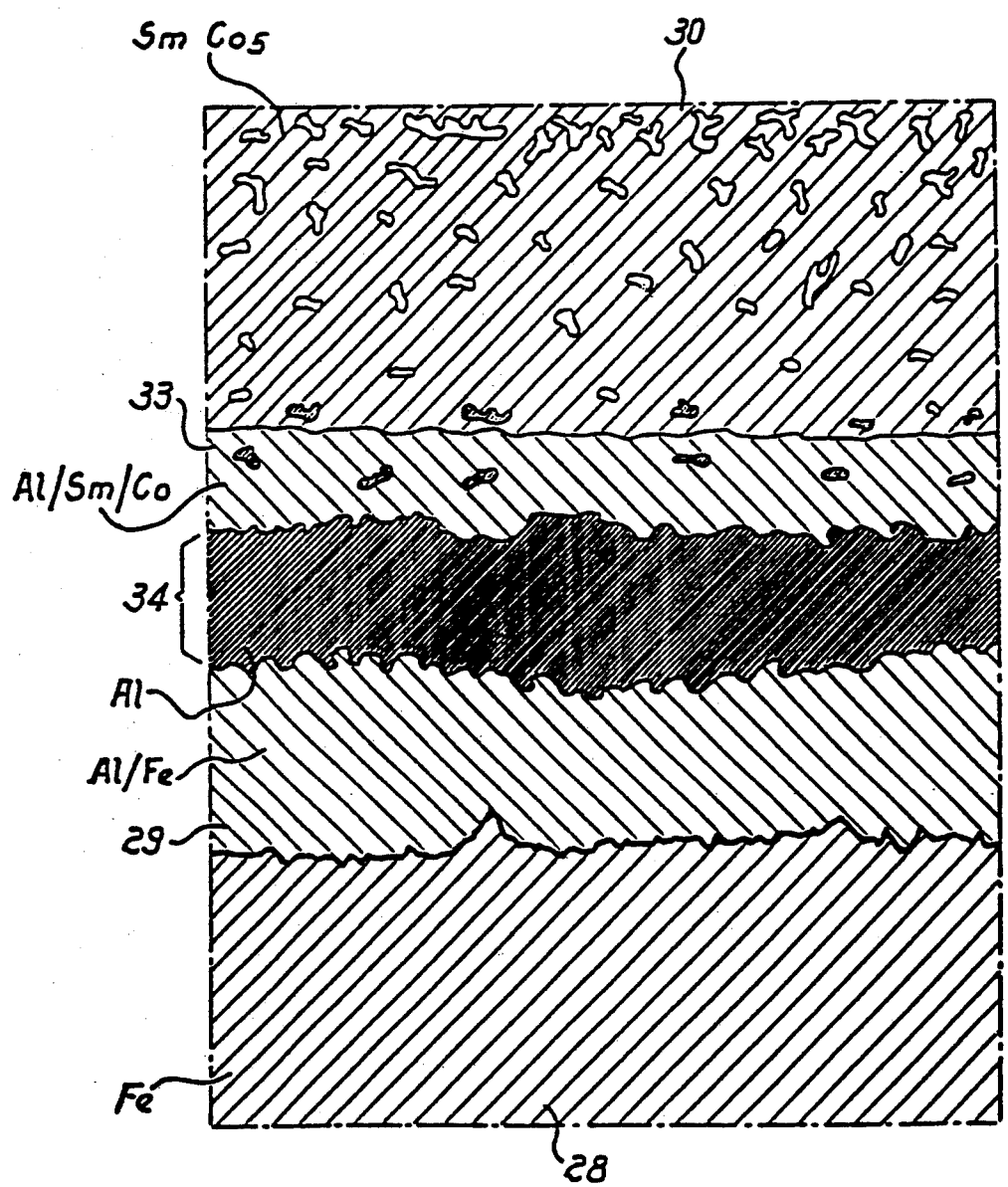

METHOD OF MAKING A BRUSHLESS ELECTRIC MOTOR AND ROTOR THEREFOR

DESCRIPTION OF THE PRIOR ART

Brushless electric motors having rotors are well known. In these motors the stator has a number of reversible electromagnets, whereas the rotor is provided with a number of permanent magnets. The reversible electromagnets of the stator are connected to a controller. The controller causes the reversible electromagnets to produce a rotating field. This magnetic field couples with the permanent magnets of the rotor and causes the rotor to rotate.

In the prior art the permanent magnets are held onto the rotor by means of retaining bands and/or organic glue such as epoxy resin.

The bands undesirably increase the inertia of the rotor and undesirably increase the air gap. Prior attempts to eliminate these bands have been unsuccessful, because of the lack of reliability of the organic glue and for other reasons. Furthermore the strength of the organic glue is adversely affected by high temperature and by the great centrifugal forces which occur when the rotor rotates at high speed. If a rotor magnet becomes detached from the rotor it can damage the entire motor.

BRIEF OBJECTS OF THE PRESENT INVENTION

Accordingly it is an object of the present invention to provide an improved brushless electric motor substantially free of one or more disadvantages of prior motors.

Another object of the present invention is to provide an improved rotor not requiring any retaining band.

Still another object of the present invention is to provide an improved rotor which does not employ glue.

Still another object of the present invention is to provide an improved rotor in which the magnets are permanently and securely bonded to the rotor.

Yet another object of the present invention is to provide an improved process for producing rotors.

An additional object is to provide an improved rotor having an increased magnet surface area.

Additional objects and advantages of the present invention will be apparent to those of ordinary skill in the art by reference to the following description and drawings wherein:

BRIEF DESCRIPTION OF THE FIGURES

FIG. 4 is a representation derived from a photomicrograph showing the bonding metal layer between a permanent magnet and the shaft of a rotor of the present invention.

According to the present invention there is provided an improved electric motor having an improved rotor. The rotor has a shaft, and at least one metal permanent magnet bonded to the shaft by a thin layer of bonding metal between the permanent magnet and the shaft. In one embodiment the rotor has a number of separate permanent magnets. In another embodiment the permanent magnet is a single piece.

The permanent magnets can be produced from sintered particulate ferromagnetic particles. In a preferred embodiment each particle is a single magnetized domain. A wide variety of metals can be employed to produce the permanent magnets such as $SmCo_5$ and $Sm_2Co_{17}$, these compounds alloyed with iron, as well as $xFeB$ wherein X is a rare earth metal. Particularly preferred rare each compositions include NdFeB and PrFeB. The most preferred metal is $Sm_2Co_{17}$. Of course alloys of these intermetallic compounds with each other and with other metals can be used.

The permanent magnets of the present invention are preferably of porous metal. These permanent magnets can be produced by conventional sintering techniques. These techniques produce permanent magnets having a porosity of from 1 to 20 percent and preferably 2 to 10 percent. In other words the density of the metal of the magnets is from 80 to 99 and preferably from 80 to 98 percent of the theoretical density if there were no pores.

In the present invention the bonding metal preferably has a melting point less than the Curie temperature of the permanent magnets, and generally at least 50° C. less.

Figure 1:
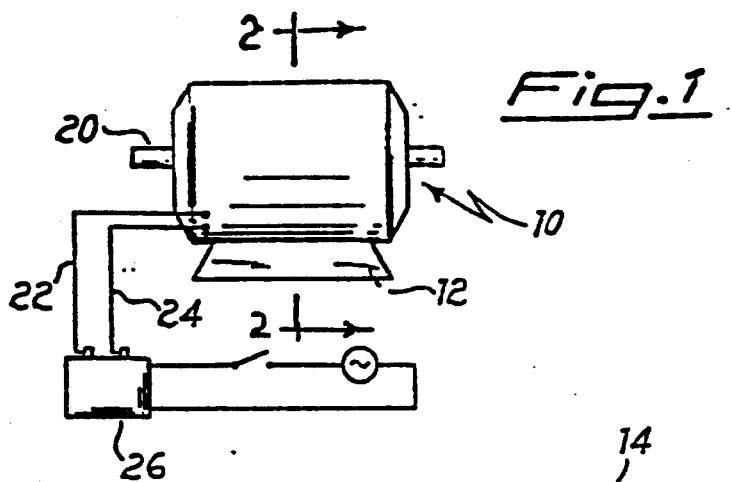
FIG. 1 is a schematic representation of a motor of the present invention.
Figure 2:
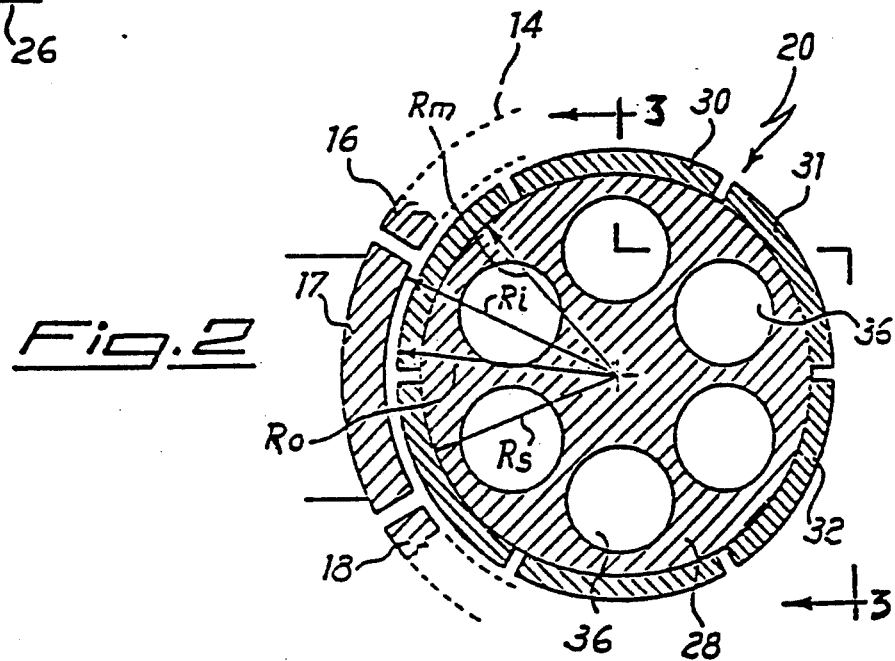
FIG. 2 is an enlarged sectional view of the stator and of a rotor of the present invention taken along line 2—2 of FIG. 1.

Referring now to the drawings in general and in particular to FIGS. 1 and 2, there is shown a motor 10 of the present invention. Motor 10 includes a frame 12 and a ring 14 of reversible electromagnets such as electromagnets 16, 17, 18 which are carried by frame 12. A rotor 20 is rotatable within the frame 12. The reversible electromagnets 16, 17, 18 surrounding the rotor 20 are connected through wires 22, 24 to a motor controller 26. As alternately reverses the polarity of the reversible electromagnets 16, 17, 18 causing the rotor 20 to rotate.

Figure 3:
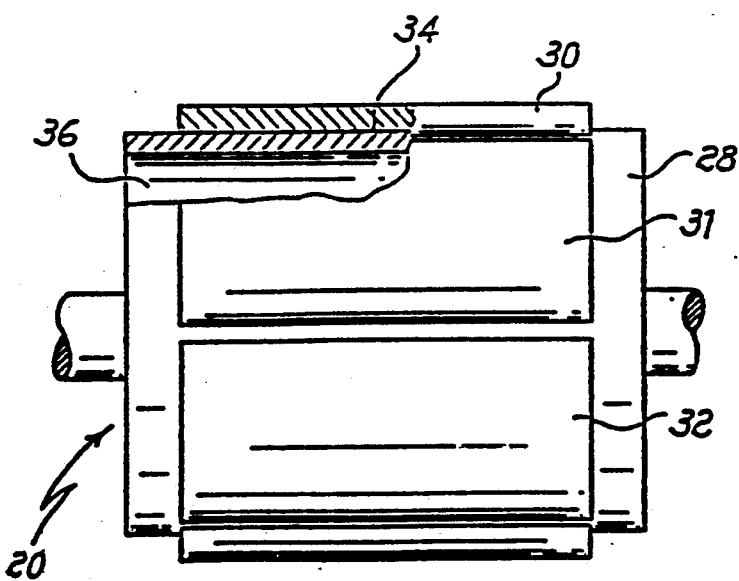
FIG. 3 is a side view taken along line 3—3 of FIG. 2.

Referring now to FIGS. 2 and 3 there is shown the rotor 20 of the present invention comprising soft iron shaft 28. Permanent metal magnets such as the magnets 30, 31, 32 are bonded to the shaft 28 by a thin layer of bonding metal such as the layer 34 between the magnet 30 and the rotor 28. Similar layers are provided between the rotor 20 and each of the magnets 31, 32. The rotor 20 is conventionally provided with a number of holes such as the hole 36 which lighten the rotor 28 and thus reduce its rotational inertia.

The radius $R_s$ of the shaft must be substantially equal to the inside radius $R_m$ of the permanent magnet 30. Furthermore the outside radius $R_o$ of the magnet must be about 1 to 5 mm less than the inside radius $R_i$ of the reversible magnets such as the reversible magnet 17. This difference $(R_i - R_o)$ is sometimes referred to as the air gap.

As shown in FIG. 4 it can be seen that the bonding metal layer 34, which fixedly and securely bonds the porous magnet 30, has filled some of the pores of the porous magnet 30 and has diffused into the metal of the shaft 28 during melting of the intermediate layer.

Examples of suitable metals includes among others zinc, tin, and aluminum. An alloy of 85 weight percent zinc and 15 weight percent aluminum is preferred because of strength, cost, availability and inertness; and because it has a melting point of about 400° C. well within the desired range.

The bonding metal can be applied by a wide variety of techniques such as spraying of the molten metal or by the use of foil. The bonding metal can be applied to the shaft 28, to the permanent magnets 30, 31, 32 or to both.

After the bonding metal is applied, the rotor 20 with shaft 28 and permanent magnets 30, 31, 32 is called a rotor assembly. The rotor assembly with unmelted bonding layer is placed in an oven and heated to melt the bonding layer. In one embodiment a temperature above the melting point of the bonding metal and below the Curie temperature of the metal of the magnets is used. In another embodiment the heating is conducted at a temperature above the melting point of the bonding layer but below the temperature at which the microstructure of the permanent magnets is adversely affected.

The rotor 20 is removed from the oven as soon as the bonding metal melts. In this manner the bonding metal permeates the pores of the porous metal an amount sufficient to bond the magnets to the shaft but insufficient to reduce the magnetism of the permanent magnet.

In that special preferred embodiment of FIG. 4 wherein the shaft is iron and wherein the permanent magnets is a Co-containing alloy, the bonding metal is diffused into the shaft, zone 29, and into the permanent magnets, zone 33. Furthermore, in zone 29, the iron of the shaft is diffused into the bonding layer. Additionally the cobalt of the permanent magnet is diffused into the bonding layer in zone 33.

It will be understood that changes and modifications can be made without departing from the spirit and scope of the invention as described above and as defined in the appended claims.

What is claimed is:

1. A process for producing a rotor for a brushless electric motor, said rotor comprising:
   A. a soft-iron shaft; and
   B. a plurality of porous metal permanent magnets of $Sm_2Co_{17}$ bonded to the shaft by a thin layer of bonding metal between the magnets and the shaft; and wherein the bonding metal is an alloy of 15 weight percent aluminum, balance essentially zinc;

said process comprising the steps of:
   I. assembling a rotor assembly of:
      A. the soft-iron shaft; and
      B. one or more permanent magnets surrounding the shaft; and
      C. a layer of unmelted bonding metal between the shaft and the permanent magnets to form a rotor assembly; and then
   II. heating the rotor assembly to a temperature above the melting point of the bonding metal, thereby melting the unmelted bonding metal thereby causing the bonding metal to permeate the pores of the porous metal magnet an amount sufficient to bond the magnet to the shaft but insufficient to adversely affect the magnetism of the permanent magnet thereby producing said rotor.

* * * * *